Patented Dec. 18, 1951

2,579,375

UNITED STATES PATENT OFFICE 2,579,375

NONELECTROSTATIC PLASTIC COMPOSITIONS

John B. Eisen, Waterloo, Wis., assignor to Monsanto Chemical Company, St. Louis, Mo., a corporation of Delaware No Drawing. Application January 4, 1950,
Serial No. 136,842

6 Claims. (Cl. 260—32.4)

This invention relates to synthetic resin molding materials, and more specifically to such molding materials which are substantially nonsusceptible to the accumulation of electrostatic charges and to a method for eliminating the highly undesirable effects of electrostatic charges which build up on synthetic resin articles, more particularly articles comprising synthetic resins such as polyvinyl chloride, polystyrene or copolymers of either which are particularly susceptible to acquiring electrostatic charges.

Fibers, films, sheets and other articles made of such polymers have been particularly subject to the objectionable characteristics resulting from high electrostatic susceptibility. As a result of such susceptibility, these articles accumulate electrostatic charges which attract dust, lint, tobacco ashes, and like materials and cause such particles to cling tenaciously to the articles. In the case of fibers, for example, a fiber composed of a synthetic resin having a high electrostatic susceptibility clings to guides and rolls of textile machinery and is damaged or seriously weakened by such machinery if not satisfactorily treated to eliminate electrostatic charges.

Prior to this time, no method for eliminating these defects has been described which will remain effective over an indefinite period of time, or which constitutes more than an essentially temporary treatment, or which is independent of the ambient humidity. The methods of the prior art depend on the property of directly wetting the synthetic resin articles with an aqueous material or upon the property of deliquescence to cause the article to be so wetted. Such materials include glycols, glycerine, sorbitol, sulfonates, and the materials disclosed in U. S. Patent 2,403,960. These treatments produce only a temporary absence of electrostatic charge; the length of time during which the treatment remains effective being dependent on the ambient humidity. In dry climates the duration is very short. The effectiveness of such treatments may be renewed by wiping with a wet cloth or otherwise wetting the article but such re-treatment remains effective only until the water vaporizes. For example, an article which has been treated by such a method, and then allowed to remain in a paper container such as an envelope, until dry, acquires an electrostatic charge from friction with the paper upon merely being removed from such a container.

My invention, on the other hand, provides substantially permanent freedom from the disadvantages of electrostatic charges. This invention does not in any way depend on wetting the molded article with aqueous or deliquescent substances and therefore produces results substantially independent of humidity. A further advantage of my invention over the prior art is that it makes possible the production of electrostatically non-susceptible articles directly by the molding in a single operation instead of being restricted to methods of subsequent treatment.

An object of this invention is therefore to provide a method for eliminating the effects of electrostatic charges on synthetic resin articles.

Another object is to provide articles comprising synthetic resins which are free of the effects of electrostatic charges.

Another object is to provide a method of substantially permanently making synthetic resin articles free from the effects of electrostatic charges.

Another object is a plastic material in which the tendency to build up static surface charges is largely reduced and even completely eliminated.

Another object is a new plastic composition.

Another object is novel means to reduce the static charges in objects made by injection molding processes.

Further objects and advantages of this invention will become apparent as the following detailed description proceeds.

In accordance with my invention, I incorporate in a molding powder which may comprise any resinous polymer susceptible to accumulation of an electrostatic charge, 0.005 to 5.0 percent of a lipophilic quaternary ammonium salt having only hydrocarbon radicals attached to the nitrogen atom, at least one of which has at least 6 carbon atoms and at least one of which has at most 4 carbon atoms.

The incorporation may be accomplished by any of the methods known to the prior art, such as by adding the ammonium salt to the powder either directly or in solution and by mixing either stirring, tumbling or by co-extruding and subsequently grinding the ingredients. Articles made from such molding powder are found to accumulate substantially no electrostatic charges, even after vigorous rubbing with woolen or cotton cloth.

The invention is further illustrated by the following specific examples, which are given by way of illustration only and are not in any sense to be construed by way of limitation. All parts and percentages shown in the examples are by weight.

*Example I*

Polystyrene granules having an average molecular weight of 20,000 and an average diameter of a quarter inch were tumbled with a mixture of ½ percent of dilauryldimethyl ammonium chloride and ½ percent of polyethylene glycol ether, having an average molecular weight of 400. The resulting material was extruded to mix the components thoroughly and was then molded in an injection molding machine at 325° F. The articles thus produced were tested and were proven to be substantially free from electrostatic charge for a period of 6 months, as expressed by lack of attraction for fine particles of dust, pulverized cigarette ashes and other similar non-conducting particles.

Example II

One part of dilauryldipropyl ammonium bromide was incorporated with 999 parts of polystyrene molding powder by mixing the materials and then passing them through an extruder to secure intimate mixture and the resulting composition was injection molded at 360° F. with a mold temperature of 180° F. The resultant moldings were determined to have substantially no electrostatic charge, as measured with an electronic voltmeter. The effectiveness of the treatment was confirmed over a period of 6 months.

Example III

To 98.5 parts polystyrene molding powder were added 0.75 parts trioctadecylmethyl ammonium chloride and 0.75 parts polyethylene glycol ether having an average molecular weight of 400. The ingredients were mixed as in Example I. The resultant product was comminuted and was then molded in a compression molding press at 210° F. The article thus molded was tested for electrostatic charge and was found to be non-static; it remained so after 6 months.

Example IV

Polystyrene granules having an average molecular weight of 20,000 and an average diameter of a quarter inch were tumbled with a mixture of 4.5 percent of dioctadecyldiethyl ammonium sulfate and 0.5 percent of polyethylene glycol ether having an average molecular weight of 400. The resulting material was extruded to mix the components thoroughly and was then molded in an injection molding machine at 250° F. with a mold temperature of 100° F. The articles thus produced were tested to determine their susceptibility to becoming electrostatically charged by rubbing vigorously with a wool cloth and then observing the amount of attractive force exerted on lint, dust and pulverized cigarette ashes. No effects of the presence of an electrostatic charge could be observed. The effectiveness of the treatment was unimpaired after 6 months.

Example V

To 97 parts of molding powder comprising a copolymer of 88 percent vinyl chloride and 12 percent vinyl acetate were added 3 parts of dibenzyldimethyl ammonium acetate. The mixture was thoroughly intermingled by tumbling and extruding and was then molded into small blocks in an injection molding machine. The resultant articles were found to have substantially no electrostatic charge after being rubbed vigorously with a wool cloth. Testing was continued at monthly intervals and the absence of any electrostatic charge confirmed through a 6 month period.

Example VI

To 96 parts of cellulose acetate butyrate molding powder were added 4 parts of dilauryldimethyl ammonium chloride. The mixture was thoroughly intermingled by tumbling and extruding and was then molded into small blocks in an injection molding machine. The resultant articles were found to be substantially free from electrostatic charge after being rubbed vigorously with a wool cloth. Testing was continued at monthly intervals and the absence of any electrostatic charge confirmed throughout a 6 month period.

Example VII

To 99.95 parts of polymethylmethacrylate molding powder was added 0.05 part of laurylbutyldimethyl ammonium iodide. The mixture was thoroughly intermingled by tumbling and extruding and was then molded into small articles in an injection molding machine. The resultant articles were found to be substantially free from electrostatic charge after being rubbed vigorously with a wool cloth. Testing was continued at monthly intervals and the absence of any electrostatic charge confirmed throughout a 4 month period.

Example VIII

To 98 parts of polyethylene molding powder were added 2 parts of octadecyltrimethyl ammonium sulfate. The mixture was thoroughly intermingled by tumbling and extruding and was then molded into small articles in an injection molding machine. The resultant articles were found to have substantially no electrostatic charge after being rubbed vigorously with a wool cloth. Testing was continued at monthly intervals and the absence of any electrostatic charge confirmed throughout a 6 month period.

The above examples by no means exhaust the different possible applications of my invention. They have been shown by way of illustration only and not in any sense by way of limitation.

It is to be understood that the invention is capable of considerable variation without deviation from its major aspects. Although the examples have shown the use of a number of lipophilic quaternary ammonium salts as being operative in my invention, other such lipophilic salts can be used which have only hydrocarbon radicals attached to the nitrogen atom, at least one of which has at least 6 carbon atoms and at least one of which has at most 4 carbon atoms, such as for examples, lauryltrimethyl ammonium chloride, dilauryldimethyl ammonium acetate, trioctadecylmethyl bromide, octadecyllaurylmethyl ammonium lacate, decylodecyloctadecylbutyl ammonium iodide, decahydronaphthyl octylisobutyl ammonum trichloro acetate, dilauryl dipropyl ammonum chloride, dioctadecyl diethyl ammonium chloride, and the like.

The examples have shown applicaton of my invention to polystyrene, copolymers of vinyl chloride and vinyl acetate, cellulose acetate butyrate, polymethylmethacrylate and polyethylene. It should be clearly understood that this is illustrative and not limiting in any way as the invention is applicable to all resinous polymers capable of acquiring an electrostatic charge, such as for example, cellulose acetate, polyamides, polyfluoroethylene, polyacrylonitrile, halogenated polystyrenes, polystilbenes, polybutenes and copolymers of these chemical groups.

The method and conditions for carrying out the injection molding of the compositions of my invention are not a subject of the invention and may be those of any molding procedure. Temperatures and cycle times given in the examples are purely illustrative. For example, polystyrene with lipophilc ammonium salts to which this invention relates incorporated therein may be molded at temperatures of 200° to 400° F. in a compression molding machine or in an injection molding machine with a mold temperature of 75° to 310° F.

While I generally do not favor the addition of other agents, and these are not essential to the invention, yet for some purposes I may include in the composition additional plasticizers, mold release agents and excipients or various types of surface active agents, pigments, dyes and the like. Sometimes it may be advantageous to add from 0.1 to 2.0 percent of a polyethylene glycol ether having a molecular weight from 200 to 6,000. While certain specific concentrations of anti-electrostatic material have been employed, it is to be understood that I may employ the material in question in concentrations of from 0.005 percent to 5.0 percent although for best results, I prefer to employ at least about 0.1 percent of the agent stated, and quantities in excess of 2 percent do not generally serve any useful purpose as the maximum desired effect is obtained in this range. Generally, the concentration must be great enough to make certain that molecules of the active agent are present at the surface, but need be no greater.

While I do not wish to commit myself to any particular theory regarding the cause of the efficacy of the agent stated, it is my belief that the activity is that of electroisomeric adsorptive orientation and is not dependent on ionization or on electrical conductivity. It is to be noted that agents of very low conductivity, in fact having conductivity as poor as that of transformer oil, may have an excellent anti-electrostatic efficacy.

It is thus apparent that the invention is broad in scope and is not to be restricted excepting by the claims in which it is my intention to claim all novelty inherent in the invention as broadly as possible in view of prior art. Having thus disclosed my invention, I claim:

1. An article of manufacture comprising a molded thermoplastic resinous body, and distributed therethrough from 0.005 to 5.0 percent of its weight of dilauryl dipropyl ammonium bromide.

2. An article of manufacture comprising a molded thermoplastic resinous body, and distributed therethrough from 0.005 to 5.0 percent of its weight of dioctadecyl diethyl ammonium sulfate.

3. An article of manufacture comprising a molded thermoplastic body, and distributed therethrough from 0.005% to 5.0% of its weight of a compound taken from the group consisting of dilauryl dipropyl ammonium bromide and dioctadecyl diethyl ammonium sulfate.

4. An article of manufacture comprising a molded polystyrene body, and distributed therethrough from 0.005% to 5.0% of its weight of a lipophilic quaternary ammonium salt having only hydrocarbon radicals attached to the nitrogen atom, at least one of which has at least six carbon atoms and at least one of which has at most four carbon atoms.

5. An article of manufacture comprising a molded polystyrene body, and distributed therethrough from 0.005% to 5.0% by weight of dilauryl dipropyl ammonium bromide.

6. An article of manufacture comprising a molded polystyrene body, and distributed therethrough from 0.005% to 0.5% by weight of dioctadecyl diethyl ammonium sulfate.

JOHN B. EISEN.

REFERENCES CITED

The following references are of record in the file of this patent:

UNITED STATES PATENTS

| Number | Name | Date |
| --- | --- | --- |
| 2,234,203 | Starkweather et al. | Mar. 11, 1941 |